United States Patent [19]

Critten et al.

[11] 4,019,038

[45] Apr. 19, 1977

[54] CORRELATORS

[75] Inventors: Donald Louis Critten; Peter Alan Johnson, both of Luton, England

[73] Assignee: Kent Instruments Limited, Luton, England

[22] Filed: Mar. 4, 1975

[21] Appl. No.: 555,250

Related U.S. Application Data

[63] Continuation of Ser. No. 261,327, June 9, 1972, abandoned.

[30] Foreign Application Priority Data

June 10, 1971 United Kingdom ............ 27366/71
Feb. 3, 1972 United Kingdom ............... 5184/72

[52] U.S. Cl. ........................... 235/181; 73/194 E; 235/151.34
[51] Int. Cl.² ......................................... G06F 15/34
[58] Field of Search ........ 235/181, 151.34, 150.53; 73/194 EF; 324/160, 161, 175

[56] References Cited

UNITED STATES PATENTS

| | | | |
|---|---|---|---|
| 3,480,956 | 11/1969 | Sanderson | 235/181 |
| 3,660,647 | 5/1972 | Pryor, Jr. | 235/181 |
| 3,689,157 | 9/1972 | Andermo | 324/175 |
| 3,777,133 | 12/1973 | Beck et al. | 235/181 |
| 3,789,663 | 2/1974 | Gold | 73/194 C |
| 3,812,493 | 5/1974 | Afendykiw et al. | 235/181 |
| 3,819,919 | 6/1974 | McGunigle | 235/181 |
| 3,824,015 | 7/1974 | Petit et al. | 324/175 |

FOREIGN PATENTS OR APPLICATIONS 964,581 7/1964 United Kingdom

OTHER PUBLICATIONS

Hayes et al., Correlator Design for Flow-Measurement Radio and Electronic Eng., vol. 43, No. 6, pp. 363-368, June 1973, effective date 11/1971.

*Primary Examiner*—Jerry Smith
*Attorney, Agent, or Firm*—Young & Thompson

[57] ABSTRACT

The speed of flow of a fluid is measured by transmitting across the flowing fluid upstream and downstream ultrasonic energy beams, transmitted beams, deriving electrical outputs therefrom, detecting the outputs to provide upstream and downstream detected signals representing noise imparted to the transmitted radiant energy beams by the flowing fluid, digitizing the detected signals, and imposing a time delay or delays on the upstream signal corresponding to the time delay between the upstream and downstream signals due to the spacing of the receiver means. A shift register imposes the time delay or delays and the transmission time of the shift register is controlled in response to the product of the signals.

11 Claims, 11 Drawing Figures

CORRELATORS

This is a continuation, of application Ser. No. 261,327, filed June 9, 1972, and now abandoned.

The invention relates to the correlation of electric signals particularly but not exclusively for the purpose of measuring the speed of flow of a fluid.

Arrangements are known for measuring the flow rate of a fluid in which beams of radiant energy are transmitted through the flow at two transmission positions spaced apart a known distance in the direction of flow. The beams are received and the noise modulation of each due to disturbances in the velocity profile of the fluid flow is detected. The two detected noise signals are cross-correlated and the value of the correlation delay producing maximum correlation is determined. This value of the correlation delay is a measure of the time taken for disturbances in the flow, which are transported at the mean flow velocity, to travel from the upstream transmission position to the downstream position. Thus the mean fluid flow speed can be determined from this time and the known spacing of the transmission positions. In U.S. Pat. No. 3,762,221, Oct. 2, 1973, arrangements of this general kind are described in which the frequency modulation on each beam due to disturbances in the fluid flow profile is detected to provide the noise signals for correlation.

Prior art correlators are unable to detect the side of the correlation peak to which any particular delay corresponds. By simple time differentiation, a suitable drive can be produced in the initial state but tracking will not be achieved because differentiators will not in practice detect slow drifts very readily. Also, the rate of tracking will determine the sensitivity, which is disadvantageous.

The object of the invention is to overcome these disadvantages.

The invention accordingly provides a method of cross-correlating two detected noise trains having a net time delay between similar characteristics thereof, the method including the steps of deriving a pair of signals representative of respective noise trains, imposing a time delay on the signal derived from a leading one of the noise trains, effecting a relative phase shift substantially equal to an odd number multiple of 90° between the pair of signals, obtaining the product of the signal derived from a trailing one of the noise trains and the delayed signal derived from the leading one of the noise trains, after effecting the said phase shift, and adjusting the time delay imposed on the signal derived from the leading one of the noise trains to reduce the said product to zero.

The invention also provides apparatus for cross-correlating two detected noise trains having a net time delay between similar characteristics thereof, the apparatus comprising circuits for deriving a pair of signals each from a respective one of the detected noise trains, a delay means for imposing at least one adjustable delay on the signal derived from the leading one of the noise trains, and means responsive to the product of the signals to adjust the adjustable relay or each adjustable delay in a direction to minimise the product.

The invention is advantageously employed to the measurement of fluid flow. Thus the two noise trains can be obtained from transducers responsive to radiant energy beams transmitted across the flowing fluid at positions spaced apart along the direction of fluid flow. The imposed delay or delays can be provided by a shift register driven by the net delay at a frequency controlled by the product of the signals. Where the signals are obtained from flowmeter apparatus of the general kind described above, the shift register switching frequency is proportional to the fluid flow rate. By providing information as to which is the leading train, the apparatus can be arranged to track velocity changes as they occur. The invention is not however limited in its applicability to flow velocity measurements, but can be used for example for range finding by adding a pseudo random noise train to a radar beam for correlation with the reflected beam.

The invention will be better understood from the following illustrative description and the accompanying drawings.

Figure 4:
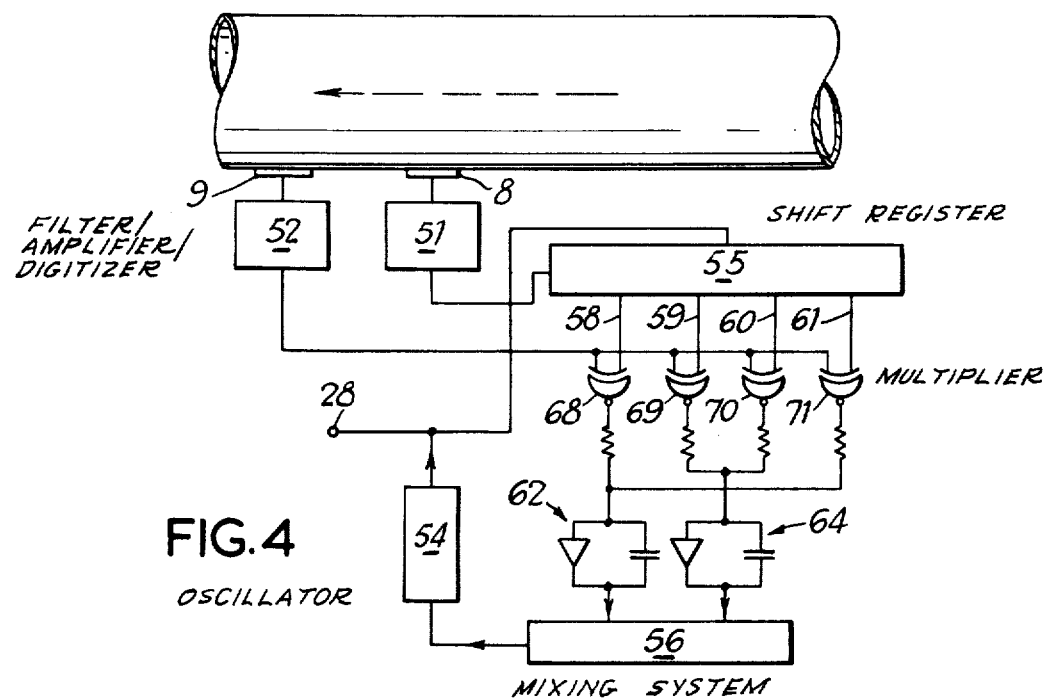

FIG. 4 schematically represents a third flowmeter embodying the invention; and

Figure 5:
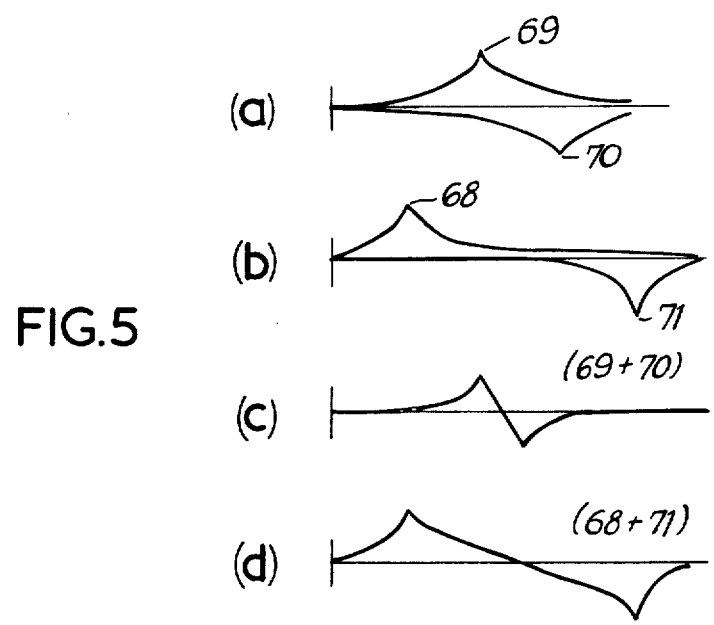

FIGS. 5($a$)–($d$) and 6($a$)–($c$) represent correlation peaks obtained with the flowmeter of FIG. 4 and with a modification thereof respectively.

Figure 1:
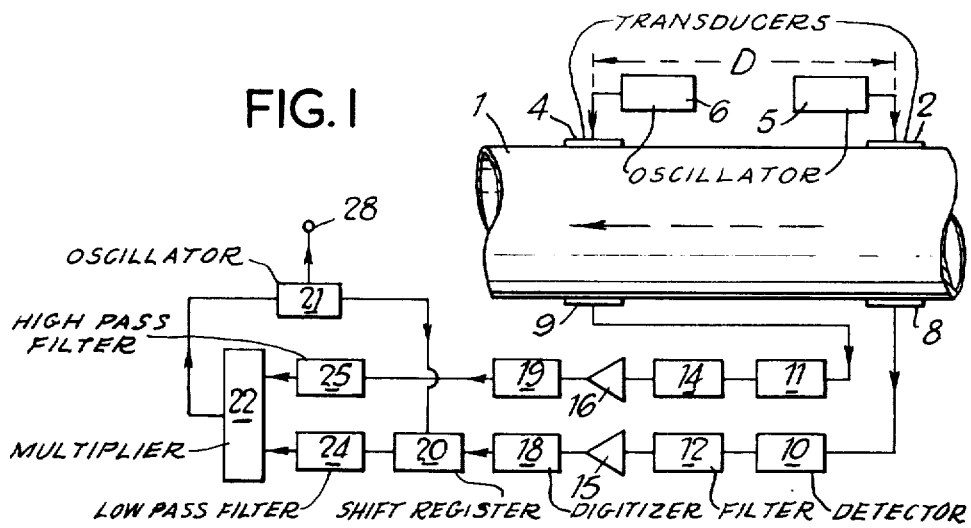
FIG. 1 is a schematic representation of a first flowmeter embodying the present invention, including circuit elements in block diagram form.

The cross correlation flowmeter apparatus illustrated in FIG. 1 is arranged to monitor continuously the speed of flow, in the direction indicated by an arrow, of a fluid within a conduit or pipe 1. Upstream and downstream transducers 2, 4 are spaced longitudinally of the pipe by the distance D. The transducers are energised by respective oscillators 5, 6 and are positioned so as to transmit radiant energy beams, in the form of ultrasonic beams, across the pipe 1 at suitable different carrier frequencies. Receiver transducers 8, 9 are located opposite the transducers 2, 4 respectively. After transmission through the flowing fluid, the ultrasonic beams from the transducers 2 and 4 are picked up by the receiver transducers 8 and 9.

The electrical outputs of the transducers 8, 9 are applied respectively to detectors 10, 11. The detectors can be of any suitable kind. The detectors 10, 11 detect the phase modulation of the carrier frequencies of the oscillators 5, 6. Means (not shown) can be provided for ensuring that the maximum carrier phase variation likely to be encountered will fall between $\pi$ and $-\pi$.

The outputs of the detectors 10, 11 represent noise and their characteristics represent phase variations of the carrier frequencies. The outputs are applied to respective filters 12, 14 which function to remove undesirable extraneous frequencies, particularly very low and zero frequencies. The filtered outputs are amplified in respective limiting amplifiers 15, 16 and each is subsequently digitized by one of digitizers 18, 19.

After this treatment, the output of the upstream detector 8 is applied to a shift register 20. The transmission time of the shift register 20 is controlled by a variable frequency oscillator 21, the frequency of which is dependent on the output of a multiplier 22. So that the multiplier output can discriminate as to the direction of any change in the net time delay between the leading or upstream signal and the downstream signal, means has to be provided to effect a relative phase shift of 90° between the two signals. A low pass and a high pass filter can be employed and in the illustrated circuit, the inputs to the multiplier 22 comprise the output from the shift register 20, after passage through a low pass filter 24 and the output of the amplifier 16, after passage through a high-pass filter 25. It will be appreciated that the low pass filter gives zero phase change at low frequencies and −90° phase change at high frequencies. The high pass filter gives +90° phase change at low frequencies and zero phase change at high frequencies. Thus at every frequency there is 90° between the phase change brought about by the high pass filter and the phase change brought about by the low pass filter. The multiplier output will be at balance when the inputs are correlated fully and any departure from this condition, due to a change in the speed of fluid flow in the conduit 1, will cause a change in the multiplier output in a direction such as to adjust the oscillator output so that the shift register delay changes to effect restoration of the balance.

The signal derived from the upstream transducer output thus has a delay imposed thereon by the shift register 20, the shift register being driven by the net phase difference at a frequency controlled by the product of the treated signals. The flowmeter output, obtained from terminal 28, is thus a signal with a frequency proportional to flow velocity. As the signals are obtained from two positions a known distance D apart in the fluid flow direction the velocity of the fluid flow can be determined.

Figure 2:
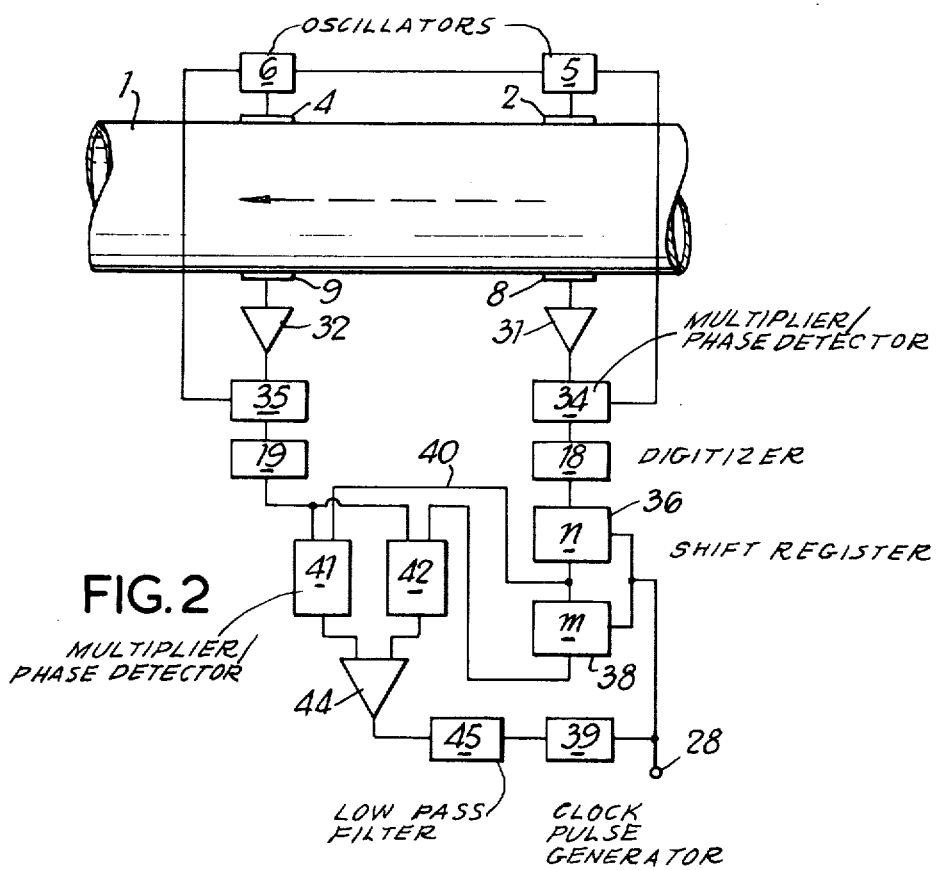
FIG. 2 is a schematic representation of a second flowmeter embodying the present invention, again with circuit elements in block diagram form.

The apparatus of FIG. 2 is intended to serve the same purpose as that of FIG. 1 but functions over a wide band width, whereas that of FIG. 1 is inherently of limited band width, defined primarily by the 90° phase shift filter. Parts and circuit elements common are given the same reference numerals in FIGS. 1 and 2.

The outputs of the receiver transducers 8, 9 are amplified in respective buffer amplifiers 31, 32 the outputs of which are supplied to multiplier/phase detectors 34, 35 respectively, each having the other input thereto derived directly from the associated one of the oscillators 5, 6. The outputs of the buffer amplifiers 31, 32 will be subject to phase fluctuations due to the advancing or retarding effect of the variations in the density of the fluid flowing along the pipe 1. The multiplier/phase detectors 34, 35 produce a voltage output which is proportional to the mean path density fluctuation. The output voltage is then converted to digital form by the digitizers 18, 19. The digitizers convert the incoming voltage into more than two levels if desired.

The output from the upstream digitizer 18 is applied to a shift register having an $n$ stage portion 36 and an $m$ stage portion 38. The shift register is clocked at a frequency $f$ generated by a voltage controlled clock pulse generator 39. A first or intermediate output is taken from the shift register portion 36 on a line 40, this output having imposed thereon a delay $t_1$ equal to $n/f$. The second output is taken from the shift register portion 38 and experiences a delay $t_2$ equal to $(n+m)/f$.

The output from the downstream digitizer 19 is applied directly to each of a pair of multipliers/phase detectors 41, 42. The multiplier 41 receives as its other input the first output on the line 40 from the shift register portion 36. The other multiplier 42 receives as its other input the second output from the shift register portion 38. The outputs of the multipliers 41, 42 either of which will be a maximum when the two inputs thereto are fully correlated, that is, when they have the same waveform, are fed to a differential amplifier 44, the output of which goes to the generator 39 through a low pass filter 45 comprising a resistor and a capacitor.

Figure 3:
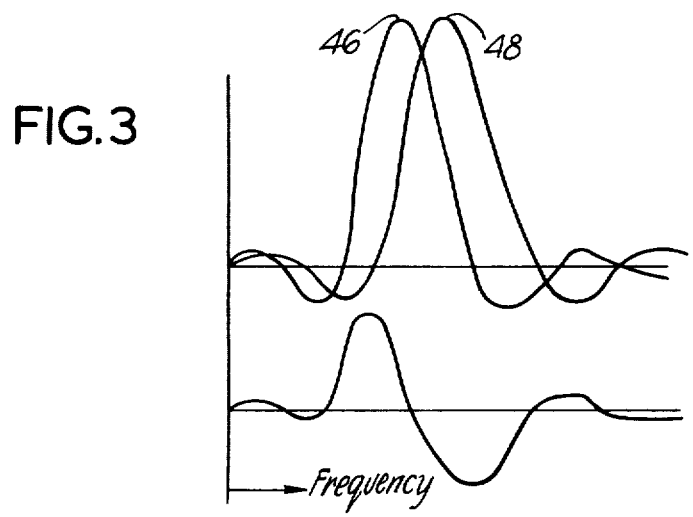
FIG. 3 represents the outputs of two circuit elements of FIG. 2.

The two outputs of the multipliers 41, 42 a function of the frequency of the clock generator 39, are shown in the upper part of FIG. 3, the lower part of which shows the related output of the differential amplifier 44. It will be seen that the two multiplier output peaks 46, 48 are separated, because of the delay due to the additional $n$ stages of the shift register portion 42.

In use, the flowmeter apparatus of FIG. 2 adjusts itself automatically until one multiplier output is just after its peak output and the other is just before. The difference output obtained enables accurate setting between peaks. Should the flow velocity in the pipe 1 change, the correlation functions are shifted in frequency, the output of one multiplier increasing and that of the other decreasing to cause a larger difference input to the amplifier 44. This of course drives the clock generator 39 so as to reduce the error until the new clock frequency has been established at which the ratio of the fluid flow velocities equals the ratio of the new and the old clock frequencies. Again, the flowmeter output, obtained from the terminal 28, is a signal with a frequency proportional to the flow velocity.

A difficulty with apparatus such as shown in FIGS. 1 and 2 is that if the cross correlation function has multiple peaks, equilibrium can be reached in respect of a minor peak instead of the major one required. The embodiment of the invention illustrated in FIGS. 4 − 6 includes arrangements whereby this possibility is eliminated or reduced. Again, parts and circuit elements in common in FIGS. 1, 2 and 4 are given like reference numerals.

In the flowmeter apparatus of FIG. 4, the electrical outputs of the receiver transducers 8, 9 are applied to respective circuit units 51, 52, each of which includes the circuitry provided in the apparatus of FIGS. 1 and 2 but in digital form. In other words, the circuit 51 in FIG. 4 is equivalent to the circuits 10, 12, 15 and 18 of FIG. 1. The circuit 52 is equivalent to circuits 11, 14, 16 and 19. The upstream output, derived from the transducer 8, is supplied to a shift register 54. The transmission time of the shift register 54 is controlled by a variable frequency oscillator 55, the frequency of which is dependent on the output of a mixing system 56. The inputs to the mixing system 56 are derived from four tapes 58, 59, 60, 61 from the shift register 54. The outer pair of taps 58, 61 are symmetrically located about the inner pair 59, 60. In other words, the outputs of taps 58, 59 may be taken from the zero of the shift register while the outputs of taps 60, 61 may be taken from the one of the shift register. Each of the outputs on the taps 58, 59, 60, 61 undergoes a one bit multiplication operation in a respective one of four exclusve or logic units 68, 69, 70, 71. The other input to each of the units 68, 69, 70, 71 is derived from the sampling unit 52 connected with the downstream receiver transducer 9. The outputs of the outer pair of units 68, 71 are combined and integrated in a network 62 and the outputs of the inner units 69, 70 are similarly treated in a network 64. The outputs of the networks 62, 64 are applied to the mixing system 56. It will be seen that the illustrated circuit corresponds in essentials to that shown in FIG. 2 except for the provision of four taps from the shift register instead of two, and operates in a similar way.

FIGS. 5 (*l*) and (*c*) show typical correlation peaks derived from the logic units 68, 69, 70, 71, the peaks being indicated by the reference numeral of the associated unit, and FIGS. 5 (b) and (d) show combined outputs identified in the same way.

It will be seen from a comparison of FIG. 5 (d) with FIG. 5 (b) that the slope of the signal of the former at zero cross-over is reduced, peak height is relatively increased, as is the amplitude of the signal away from the peaks.

The signals derived from units 69, 70, and from units 68, 71 can be combined non-linearly in the mixing system 56 or linearly. The signal to noise ratio deteriorates near zero with linear mixing but non-linear mixing of course requires the mixing system to be provided together with an extra integrator for each pair of taps.

FIGS. 3 (a) and (b) approximately show the results, comparable with those of FIGS. 3(b) and (d), obtained with a system of limited bandwidth. It will be seen that large wide peaks are obtained in FIGS. 3 (b), with a consequent decrease in susceptibility to interference. If the signals are mixed linearly, an integrator network may be used to sum the combined signals to obtain a result as indicated in FIG. 3(c). In such an arrangement, only two extra logic units are required for each extra pair of taps.

Figure 6:
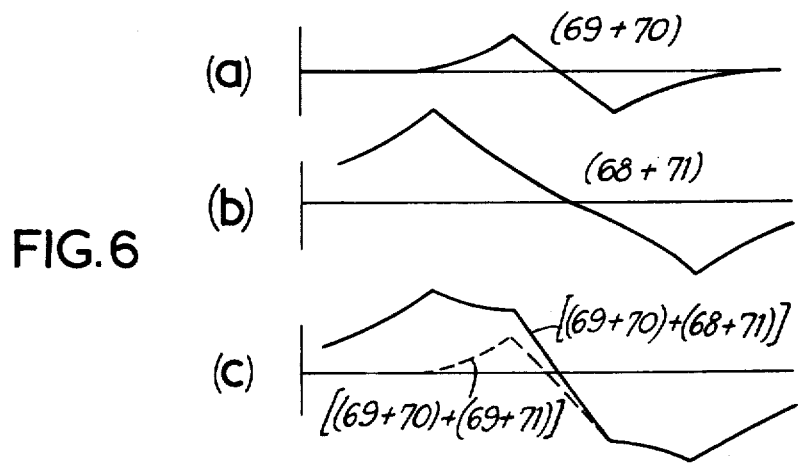

It is within the invention to employ more than one pair of extra taps and associated circuitry, subject only to the availability of taps on the shift register and the effects of the larger noise contribution due to widely spaced taps, which provide a relatively small contribution to the signal near the zero crossing. It is also within the invention to employ odd numbers of taps if required. For example, the tap 58 and the associated logic unit 68 could be omitted from the flowmeter of FIG. 1, and the output of the logic unit 69 applied to both the networks 62, 64. The combined outputs are indicated in FIG. 6(c) by the dotted line.

It will be evident that the invention can be embodied in various other ways than as specifically described. For example, instead using a quantized shift register, the apparatus could transmit amplitude information, as by means of switched capacitors or by frequency modulation.

We claim:

1. A method of cross-correlating two detected noise signals representative of respective random variations in a moving medium and having a net time delay between similar characteristics thereof, the method including the steps of deriving a pair of noise signals in the form of pulse trains representative of respective random variations, imposing a time delay on the noise signal derived from a leading one of the random variations, effecting a relative phase shift substantially equal to an odd number multiple of 90° between the pair of noise signals, obtaining the product of the noise signal derived from a trailing one of the random variations and the delayed signal derived from the leading one of the random variations, after effecting the said phase shift, and adjusting the time delay imposed on the noise signal derived from the leading one of the random variations to reduce the said product to zero.

2. A method as claimed in claim 1, and transmitting radiant energy beams across a flowing fluid at positions spaced apart in the direction of flow, said noise signals being derived from said beams, whereby the adjustment of the imposed time delay is a measure of the fluid flow velocity.

3. A method as claimed in claim 2, and digitizing the noise signals, imposing the delay by transmission of the noise signal derived from the leading random variation through a shift register, and adjusting the shift register switching frequency in accordance with the signal product, whereby the switching frequency is proportional to the fluid flow velocity.

4. A method of cross-correlating two detected noise signals representative of respective random variations in a moving medium and having a net time delay between similar characteristics thereof, the method including the steps of deriving a pair of noise signals in the form of pulse trains representative of respective random variations, imposing on the signal derived from a leading one of the random variations at least three successive delays, thereby to obtain at least three progressively delayed noise signals, obtaining at least three products each being the product of the noise signal derived from a trailing one of the random variations and a respective one of the first, second and third delayed signals, producing at least two combined noise signals each being produced by combining one of the said products with another of the said products, mixing together the combined noise signals to produce a mixed signal, and adjusting the delays imposed on the leading noise signal to reduce the mixed signal to zero.

5. A method as claimed in claim 4, wherein an even number of delays are imposed on the noise signal derived from the leading random variation thereby to obtain an even number of delayed signals, and the two products from which each combined signal is formed are products of the noise signal derived from the trailing random variation and respective delay signals which are symmetrically disposed about a mean of all of the delays.

6. A method as claimed in claim 5, wherein four delays are imposed on the noise signal derived from the leading random variation, one combined signal being formed from products which contain respective first and fourth delayed signals and the other combined signal being formed from products which contain respective second and third delayed signals.

7. A method as claimed in claim 4, wherein the combined signals are each formed by combining the products of the noise signal derived from the trailing random variation and a predetermined one of the delayed signals and the product of the said noise signal derived from the trailing random variation and a respective one of the delayed signals.

8. A method as claimed in claim 4, wherein the combined signals are mixed linearly to produce the mixed signal.

9. Apparatus for cross-correlating two detected noise signals representative of respective random variations in a moving medium and having a net time delay between similar characteristics thereof, the apparatus including circuits for deriving a pair of noise signals in the form of pulse trains representative of respective random variations, delay means for imposing a time delay on the signal derived from a leading one of said random variations, means for effecting a relative phase shift substantially equal to an odd number multiple of 90° between the pair of noise signals, means for obtaining the product of the signal derived from a trailing one of the random variations and the delayed signal derived from the leading one of the random variations, after effecting the said phase shift, and means for adjusting the time delay imposed on the noise signal derived from the leading one of the random variations to reduce the said product to zero.

10. Apparatus as claimed in claim 9, in which the circuits include digitizers and the delay means is a shift register.

11. Apparatus for cross-correlating two detected noise signals representative of respective random variations in a moving medium and having a net time delay between similar characteristics thereof, the apparatus including circuits for deriving a pair of noise signals in the form of pulse trains representative of respective random variations, delay means for imposing on the signal derived from a leading one of said random variations at least three successive delays, thereby to obtain at least three progressively delayed noise signals, means for obtaining at least three products each being the product of the noise signal derived from a trailing one of the random variations and a respective one of the first, second and third delayed signals, means for producing at least two combined noise signals each being produced by combining one of the said products with another of the said products, means for mixing together the combined noise signals to produce a mixed signal, and means for adjusting the delays imposed on the leading noise signal to reduce the mixed signal to zero.

* * * * *